United States Patent
Tseng (10) Patent No.: US 11,383,701 B2
(45) Date of Patent: Jul. 12, 2022

(54) OBSTACLE AVOIDING GUIDANCE SYSTEM

(71) Applicant: Ching Meng, Taipei (TW)

(72) Inventor: Pai-Yu Tseng, Taipei (TW)

(73) Assignee: Meng Ching, Taipei (TW)

( * ) Notice: Subject to any disclaimer, the term of this patent is extended or adjusted under 35 U.S.C. 154(b) by 608 days.

(21) Appl. No.: 16/396,187

(22) Filed: Apr. 26, 2019

(65) Prior Publication Data

US 2020/0339110 A1    Oct. 29, 2020

(51) Int. Cl.
*B60W 30/09* (2012.01)
*G06T 7/223* (2017.01)
*B60W 50/14* (2020.01)

(52) U.S. Cl.
CPC ............ *B60W 30/09* (2013.01); *B60W 50/14* (2013.01); *G06T 7/223* (2017.01); *B60W 2554/00* (2020.02); *G06T 2207/10032* (2013.01); *G06T 2207/20021* (2013.01); *G06T 2207/30261* (2013.01)

(58) Field of Classification Search
CPC .. B60W 30/09; B60W 50/14; B60W 2554/00; B60W 60/0025; B60W 2300/405; B60W 2554/40; B60W 2556/50; G06T 7/223; G06T 2207/10032; G06T 2207/20021; G06T 2207/30261; G01C 21/005; G01C 21/20

See application file for complete search history.

(56) References Cited

U.S. PATENT DOCUMENTS

| | | | |
|---|---|---|---|
| 6,327,219 B1 | 12/2001 | Zhang et al. | |
| 8,789,638 B2 * | 7/2014 | Zhang .................. | G05D 1/0255 180/167 |
| 8,886,383 B2 * | 11/2014 | Hyde ................... | A61G 7/0527 701/24 |
| 9,393,981 B1 * | 7/2016 | Lee ....................... | G05D 1/0255 |
| 10,698,419 B2 * | 6/2020 | Chang .................. | G05D 1/028 |
| 11,156,999 B2 * | 10/2021 | Lee ....................... | G05D 1/0214 |
| 2017/0108860 A1 * | 4/2017 | Doane .................. | A63B 57/20 |
| 2018/0173223 A1 * | 6/2018 | Doane .................. | G08G 1/16 |

* cited by examiner

*Primary Examiner* — Richard M Camby
(74) *Attorney, Agent, or Firm* — Muncy, Geissler, Olds & Lowe, P.C.

(57) ABSTRACT

An obstacle avoiding guidance system includes a processing device and a guidance device. The processing device sets a movement range in a certain field. The guidance device is disposed on a vehicle and has a detection module, a positioning module, and a calculation module. The detection module detects the current position of the user. The positioning module detects the current position of the vehicle and generates a position signal. The calculation module compares the position signal with the movement range for controlling the vehicle to follow the user in the movement range. Therefore, the vehicle is prevented from entering an improper area and able to effectively follow the user.

9 Claims, 7 Drawing Sheets

OBSTACLE AVOIDING GUIDANCE SYSTEM

BACKGROUND OF THE INVENTION

1. Field of the Invention

The present invention relates to control and guidance fields, and more particularly, to an obstacle avoiding guidance system for automatic following devices.

2. Description of the Related Art

Automatic following system of a vehicle is currently applied in a golf course, wherein golf clubs are carried by the vehicle, and the vehicle automatically follows the golf player by use of the automatic following function.

In disclosures of U.S. Pat. No. 9,393,981B1 and U.S. Pat. No. 6,327,219B1, a vehicle is provided with an ultra-wave detector, so as to detect if there are any obstacles around the vehicle by use of the ultra-wave signal during movement thereof.

A general golf course includes a series of holes, and each golf hole has a teeing ground and different areas including the fairway, the rough, the hazard, and the green areas. Each area has different grass levels and ground floor heights, so that some of the areas are not suitable for the vehicle to move thereon, based on the reason that the weight and the rotation of the driving wheels of the vehicle easily damage the golf course or that the terrain causes adverse effects upon the vehicle movement. As a result, the ball hitting performance and the cost of maintenance of the golf course are affected.

However, the aforementioned prior arts are only capable of detecting the obstacles around the vehicle, failing to impose a limitation of the movement area of the vehicle. As a result, during the automatic following process, if the user enters an area not suitable for the vehicle to enter, the vehicle is unable to determine that the area is not favorable for movement, and may accordingly enters such area along with the user, thus causing damage to the golf course or being hindered by the terrain.

SUMMARY OF THE INVENTION

For improving the issues above, an obstacle avoiding guidance system is disclosed, which is able to limit the movement range of the vehicle and control the vehicle to follow the user in the movement range. Therefore, the vehicle is prevented from entering an inappropriate region and achieves a proper following effect.

For achieving the aforementioned objectives, an obstacle avoiding guidance system in accordance with an embodiment of the present invention is provided, comprising:

a processing device setting a movement range in a region; and a guidance device disposed on a vehicle and having a detection module, a positioning module, and a calculation module, the detecting module being applied for detecting a current position of an user, the positioning module being applied for detecting a current position of the vehicle and generating a position signal, the calculation module receiving the movement range and comparing the position signal and the movement range, such that the vehicle is controlled to follow the user in the movement range.

With such configuration, the present invention limits the movement range of the vehicle and controls the vehicle to follow the user in the movement range. Therefore, the issue of the vehicle entering an inappropriate region due to an overly closed following distance is resolved.

In addition, when setting the movement range of the vehicle, the present invention is able to set an area in which an obstacle exists as a non-movement range. Therefore, the vehicle is able to avoid obstacles by the movement range limitation, achieving an effective following and obstacle avoiding effects.

In an embodiment of the present invention, a plurality of target points are set in the movement range, and the calculation module controls the vehicle to follow the user in the movement range and move toward the target points. Therefore, when following the user, the movement direction of the vehicle is adjusted according to each target point, so that the vehicle effectively follows the user, thus preventing the vehicle from arbitrarily and continuously moving toward the user which causes an additional power waste.

In an embodiment of the present invention, the processing module acquires longitude and latitude coordinates through a satellite image for establishing movement blocks, wherein each movement block is an area enclosed by a plurality of two-dimensional coordinates. Therefore, the data processing time and memory capacity requirements are effectively lowered, so as to efficiently establish each movement block, thus improving the data processing efficiency of the present invention.

In an embodiment of the present invention, the guidance device has an obstacle avoiding module which is applied for detecting obstacles in the movement range, so as to generate an obstacle signal. The calculation module controls the vehicle to avoid the obstacle or stop moving according to the obstacle signal. Therefore, besides limiting the movement range of the vehicle, the vehicle is allowed to avoid the obstacles in the movement range, achieving an effective following and obstacle avoiding effects of the vehicle.

In an embodiment of the present invention, the guidance device has a reminder module, which sends out a warning signal when the vehicle is determined as moving close to the border of the movement range. Therefore, the user is able to know that the vehicle is no longer able to move toward the user and only allowed to follow the user in the movement range, preventing the user from leaving the detection range of the guidance device.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 7, an obstacle avoiding guidance system 100 in accordance with an embodiment of the present invention comprises a processing device 10 and a guidance device 20.

Figure 2:
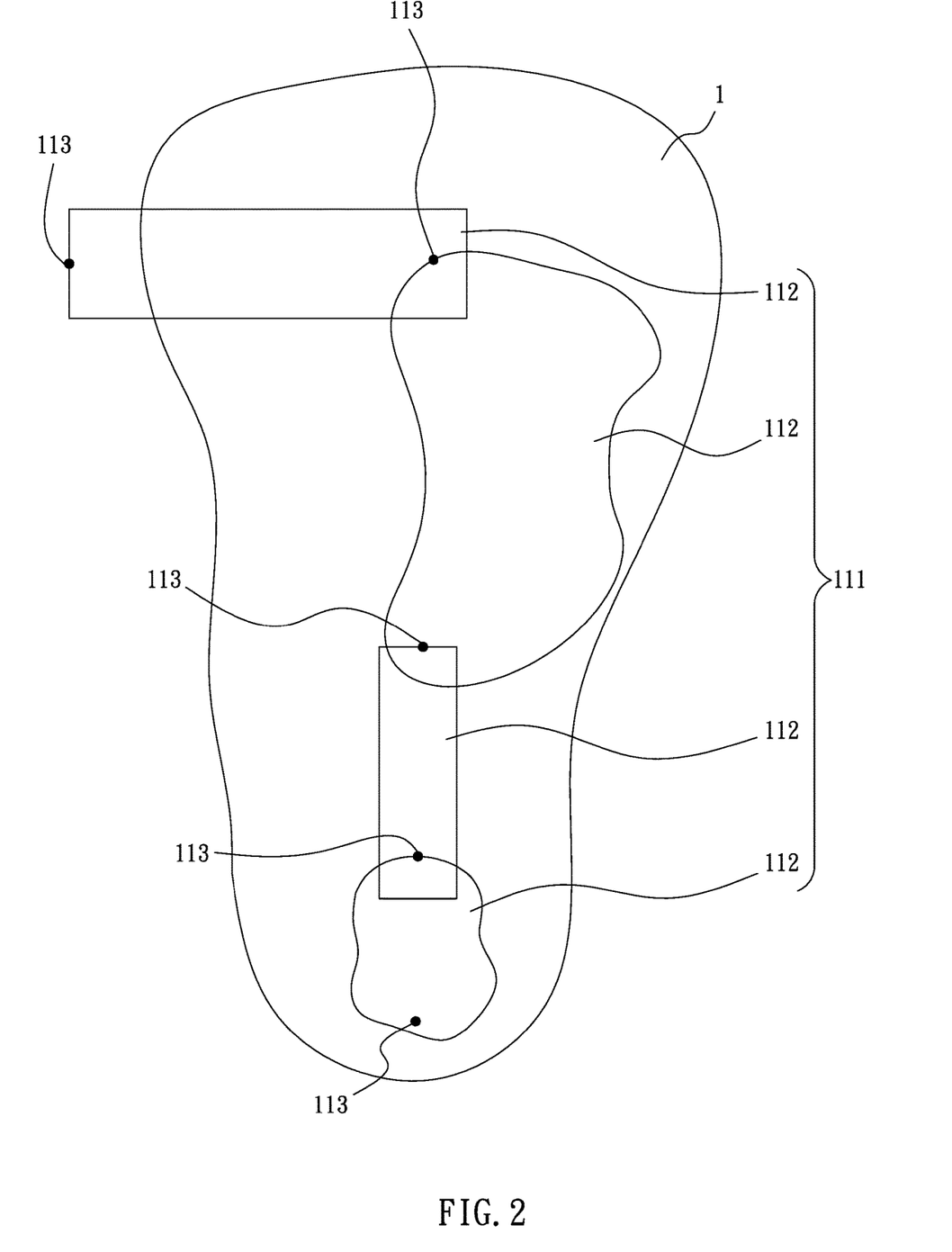
FIG. 2 is a schematic view illustrating the movement range set by the system in accordance with an embodiment of the present invention.

The processing device 10 has an establishment module 11 and a memory module 12. The establishment module 11 is applied for setting a movement range 111 in a field 1, as shown by FIG. 2. Therein, the establishment module 11 acquires longitude and latitude coordinates of the field 1 through a satellite image, so as to establish the movement range 111 according to the longitude and latitude coordinates.

The memory module 12 is applied for storing the longitude and latitude coordinates of the movement range 111. In an embodiment of the present invention, the field 1 refers to a golf course, and the processing device 10 refers to a terminal server which is disposed on a cloud server or in the golf course.

Figure 3:
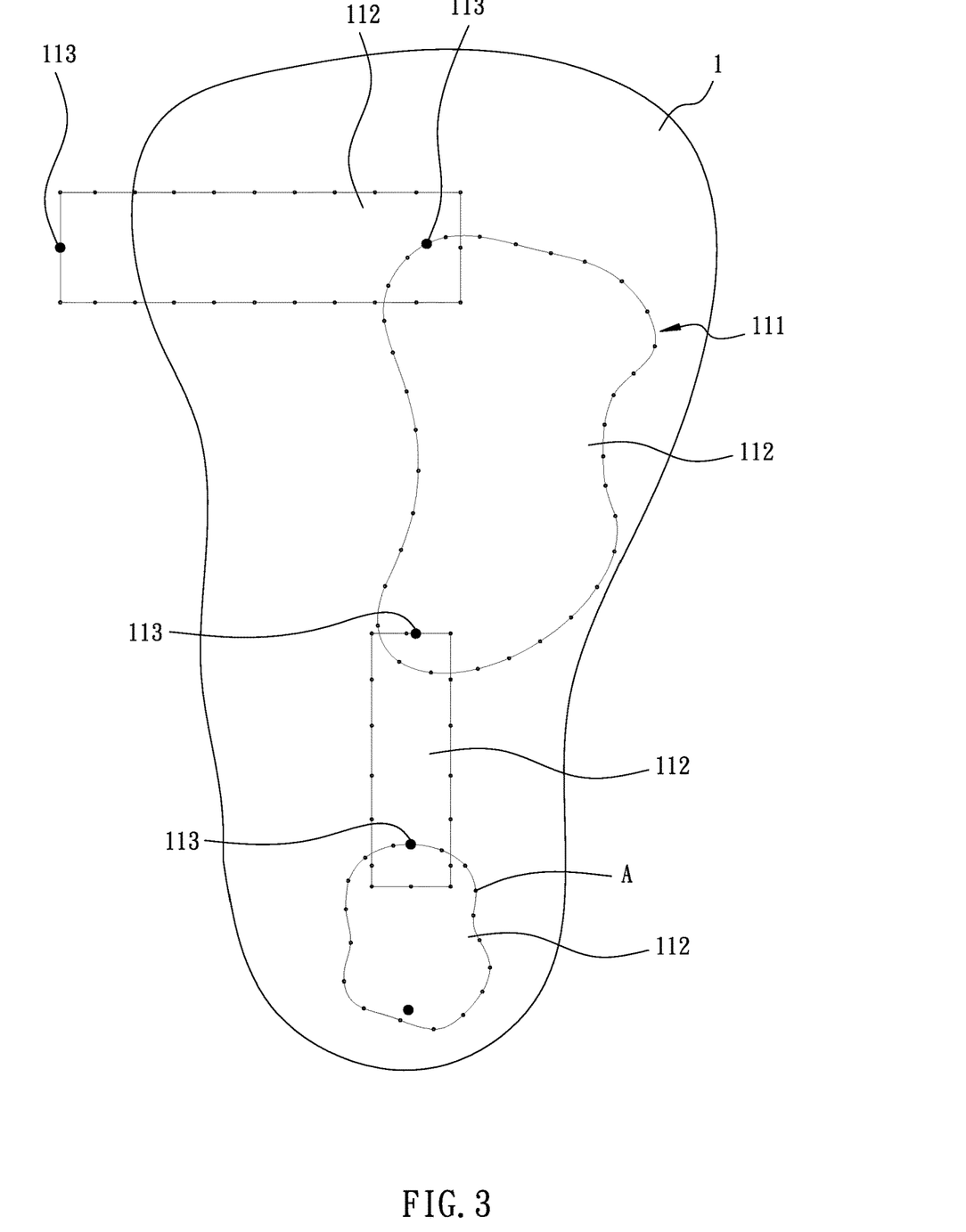
FIG. 3 is a schematic view illustrating the processing device setting up the movement range in accordance with an embodiment of the present invention.

In addition, the establishment module 11 divides the movement range 111 into a plurality of movement blocks 112, wherein the each movement block 112 is an enclosed area formed by a plurality of two-dimensional coordinate points A, while two neighboring movements block 112 partially overlap. Also, the movement range 111 has a plurality of target points 113 disposed therein, and each movement block 112 has a corresponding target point 113 therein. In an embodiment of the present invention, each target point 113 is arranged on the overlapping border of one of the two neighboring movement blocks 112, as shown by FIG. 3. In another embodiment of the present invention, the target points 113 are also able to be formed outside the movement blocks 112.

Figure 4:
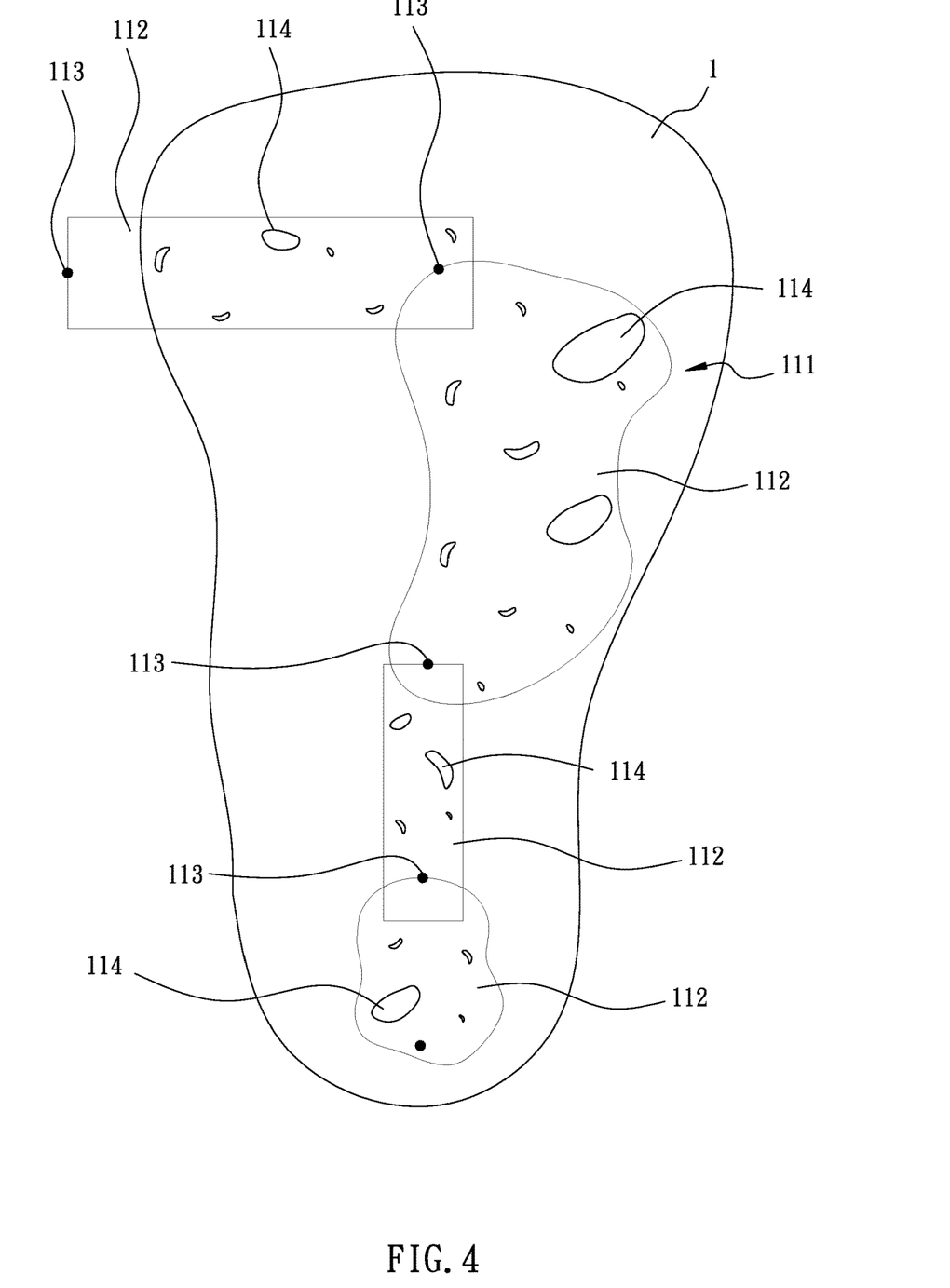
FIG. 4 is a schematic view illustrating the system setting up the special region in the movement range in accordance with an embodiment of the present invention.
Figure 5:
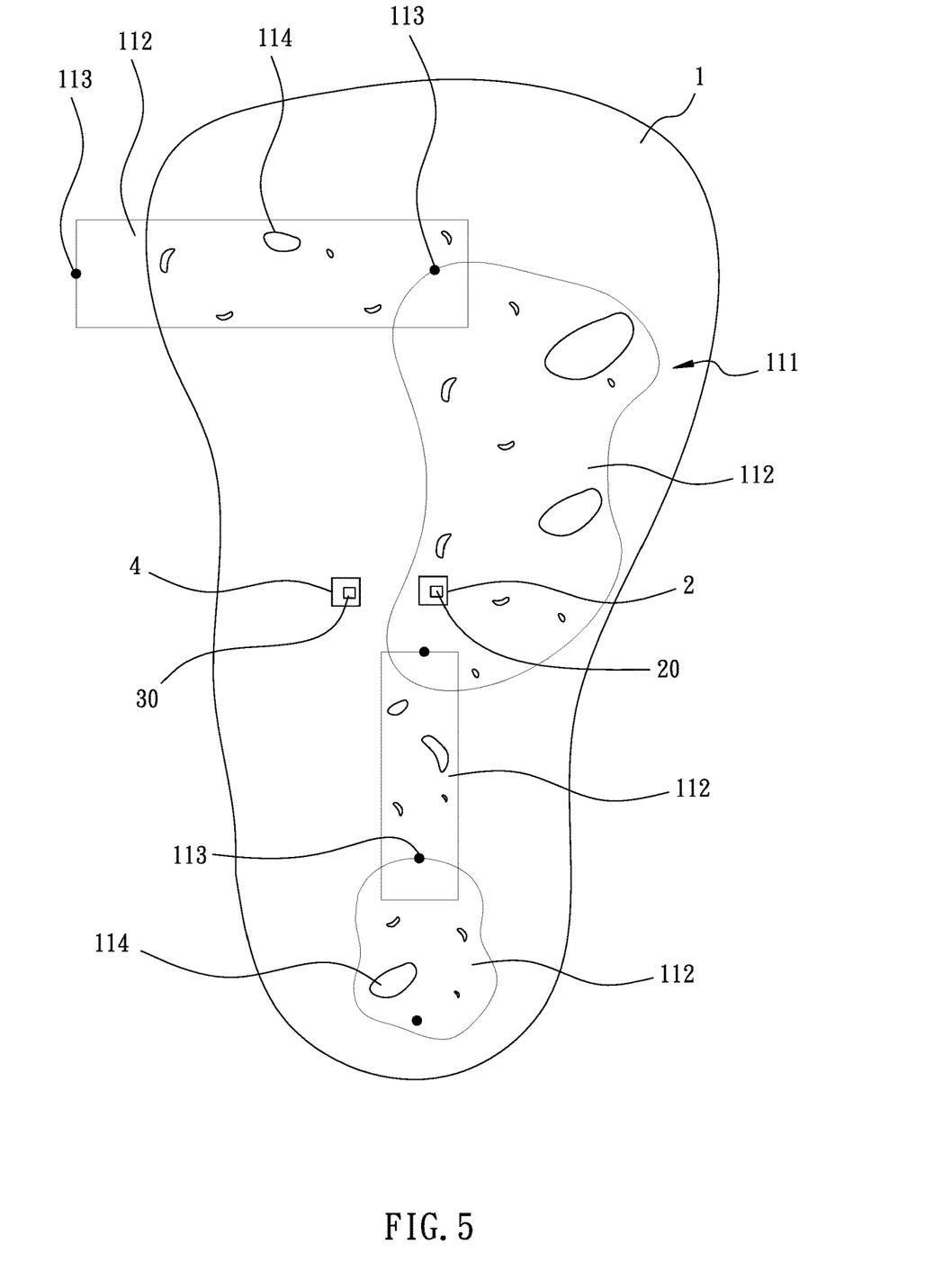
FIG. 5 is a schematic view illustrating the vehicle following the user in the movement range in accordance with an embodiment of the present invention.

Further, the establishment module 11 is applied for setting a plurality of special areas 114 in the movement range 111, wherein each special area 114 is distributed in the movement block 112, as shown by FIG. 4. Each special area 114 is able to be selected from a group consisting of a teeing ground, green area, sand pit, water pool, tree, maintenance area, and any other ground regions having a relatively larger height difference. However, the special area 114 is able to be defined according to the demands of the golf course keeper, and the aforementioned options are only for illustration, instead of imposing any limitations upon the embodiments of the present invention.

The guidance device 20 is disposed on the vehicle 2, wherein the vehicle 2 is provided with a motor, driving wheels 3, and a battery. The guidance device 20 is applied for controlling the power supplied to the motor, and the motor drives the driving wheels 3 to rotate, facilitating the moving of the vehicle 2.

Figure 1:
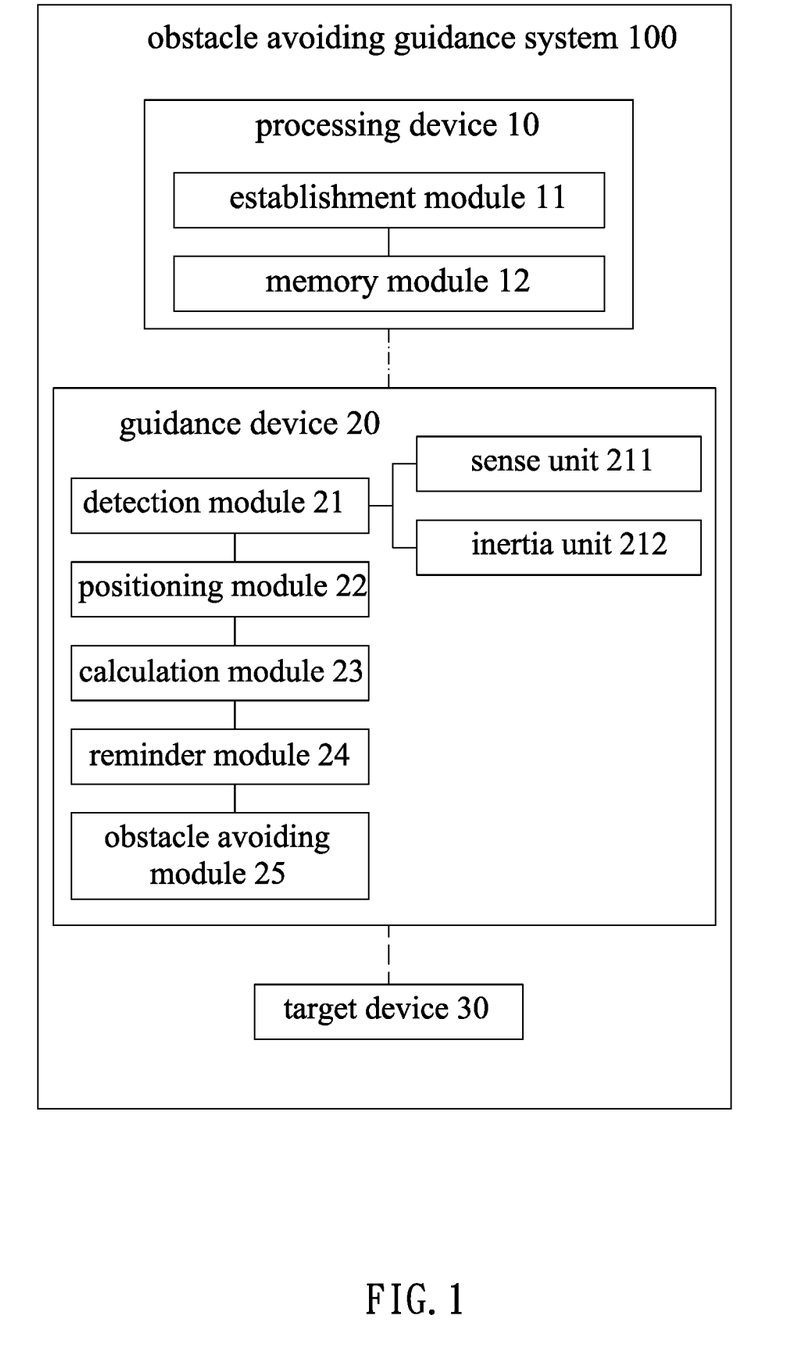
FIG. 1 is a structural block diagram in accordance with an embodiment of the present invention.

The guidance device 20 has a detection module 21, a positioning module 22, a calculation module 23, and a reminder module 24. The detection module 21 is applied for detecting the current position of the user 4. The positioning module 22 is applied for detecting the current position of the vehicle 2 and generates a position signal for determining if the vehicle 2 is in the movement block 112. Therein, the positioning module 22 is applied for generating the position signal of two-dimensional coordinates. Therein, the positioning module 22 is allowed to be a global positioning system (GPS) or other positioning systems. In an embodiment of the present invention, the positioning module generates the position signal of two-dimensional coordinates via a real time kinematic (RTK) technique.

The calculation module 23 is applied for receiving the movement range 111 stored in the processing device 10, so as to compare the two-dimensional coordinates of the position signal with each two-dimensional coordinate points A of the corresponding movement block 112, thereby confirming if the vehicle 2 is in one of the movement blocks 112. Therefore, the calculation module 23, according to each two-dimensional points A of the border of the current movement block 112, controls the motor for driving the driving wheels 3 to motivate the vehicle 2 to follow the user 4 in the movement block 112.

When the calculation module 23 limits the movement of the vehicle 2 in the movement block 112, the vehicle 2 is controlled to move toward the target point 113 in the movement block 112 at the same time, wherein each target point 113 is applied for representing the guidance point for the vehicle 2 to move from one movement block 112 into another neighboring movement block 112. In other words, when the vehicle 2 is in one of the movement blocks 112, the target point 113 in the next movement block 112 guides the vehicle 2 to move forward to get to the target point 113, achieving a guiding effect.

When the calculation module 23 determines that the vehicle 2 is closed to the border of the movement block 112, the reminder module 24 sends out a warning signal for notifying the user 4 of that the vehicle 2 is unable to move further toward the user 4 and limited in the movement range 111, so that the vehicle 2 is only able to move or turn according to the movement direction of the user 4 in the movement range 111. Therefore, the user 4 is prevented from moving too far to leave the detection range of the guidance device 20. Therein, the warning signal is allowed to be selected from a group consisting of a sound, voice, light, and combination thereof.

In an embodiment of the present invention, the user 4 carries a target device 30 which is wirelessly connected (such as via a Bluetooth connection) with the guidance device 20. The detection module 21 sends a first signal. The target device 30 receives the first signal and sends a second signal to the calculation module 23. The calculation module 23 generates a movement signal according to the first signal and the second signal, such that the vehicle 2 is controlled to turn or move along with the user 4 in the movement range 111 according to the movement signal. Therein, the target device and the detection module 21 are connected via an ultra-wideband communication.

Figure 6:
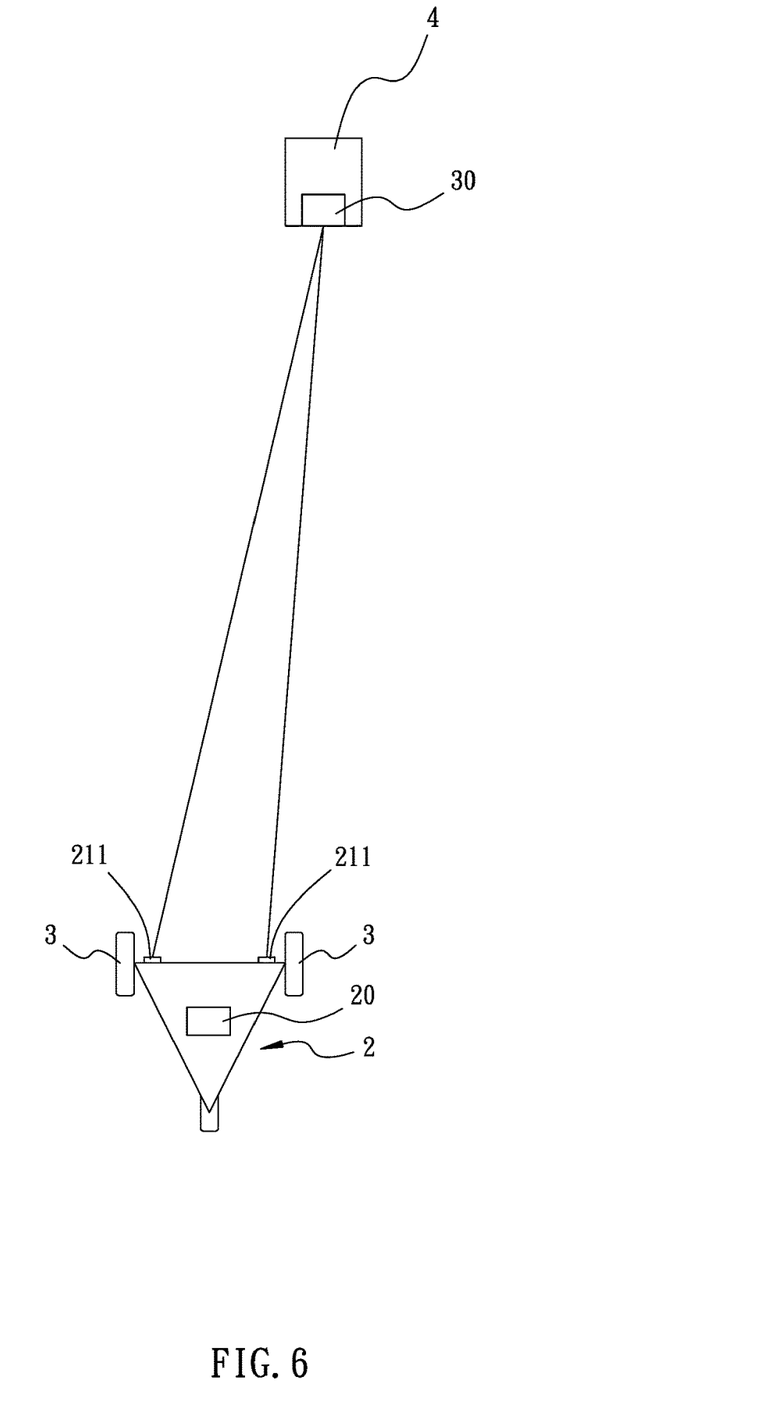
FIG. 6 is a schematic view illustrating the detection module detecting the user in accordance with an embodiment of the present invention.
Figure 7:
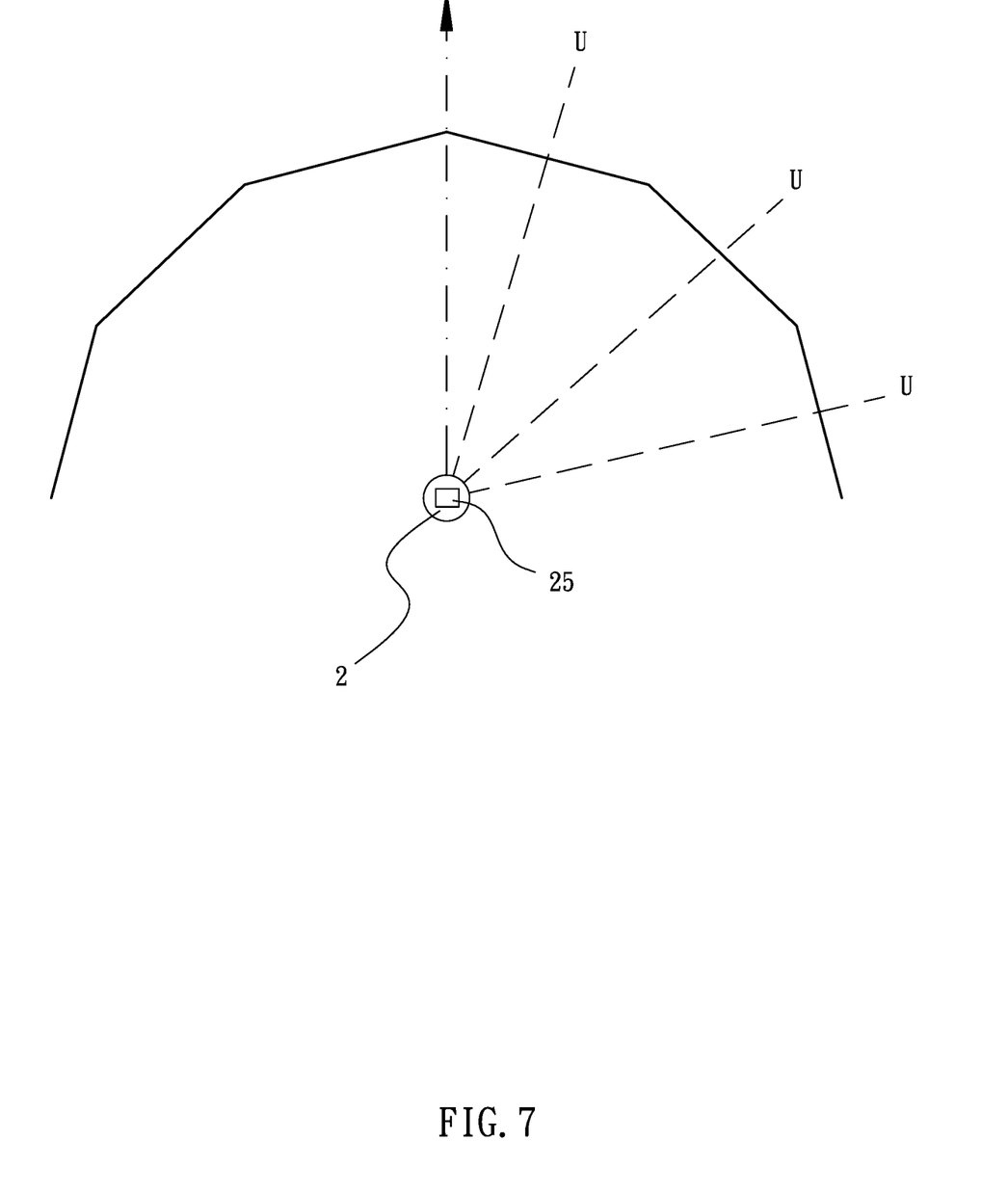
FIG. 7 is a schematic view of the obstacle avoiding module setting the detection range in accordance with an embodiment of the present invention.

More specifically, the detection module 21 has two sense units 211 and an inertia unit 212. The sense units 211 are disposed on two sides of the vehicle 2 and connected with the target device 30 via the ultra-wideband communication. The two sense units 211 sends out the first signal, respectively. The target device 30 receives the two first signals, which are then imbedded with a processing time to form a second signal which is sent back to the calculation module 23. When the calculation module 23 receives the second signal, by first subtracting the time of sending the first signal and then subtracting the time of the target device 30 processing the first signal from the time of sending the second signal, the transmission times of the first signal and the second signal are acquired. By firstly multiplying the transmission time by the light speed, and secondly dividing the summation above by 2, the distances of the two sense units 211 with respect to the target device 30 are acquired, respectively. Because the distance between the two sense units 211 is fixed, a relative distance between the central point of the vehicle 2 and the target device 30 is calculated through a trigonometric function, as shown by FIG. 6. The inertia unit 212 is applied for detecting a directional angle signal generated at the beginning and the stop of the vehicle 2, wherein before the calculation module 23 starts to control the vehicle 2 to move, the calculation module 23 generates a movement signal according to first signal, the second signal, and the directional angle signal, such that the vehicle 2 moves according to the movement signal. When the vehicle 2 starts to move, the calculation module 23 acquires the directional angle of the movement track according to the position signal generated by the positioning module 22, and the calculation module 23 applies the direction signal of the inertia unit 212 and the directional angle of the positioning module 22 with the first signal and the second signal to generate the movement signal by which the vehicle 2 is controlled to move. In an embodiment of the present invention, the inertia unit 212 refers to an inertial measurement unit (IMU).

Further, the calculation module 23 is able to determine if the vehicle 2 moves toward the special areas 114 according to the directional angle signal generated by the inertia unit 212 or the position signal of the positioning module 22. If the vehicle 2 moves toward a special area 114, the calculation module 23 controls the vehicle 2 to turn for avoiding the special area 114. More specifically, when the vehicle 2 is in a stop status, according to the directional angle signal generated according to the target device 30, the inertia unit 212 is able to determine if the vehicle 2, while starting to move again, will move toward any special areas 114 in the movement block 112. In addition, during the vehicle 2 following the user 4, the position signals of the positioning module 22 forms a movement track, by which the directional angle of the vehicle 2 is acquired for determining if the vehicle 2 moves toward the special areas 114.

Also, the guidance device 20 further has an obstacle avoiding module 25 which is applied for detecting the obstacles in the movement range 111, so as to generate an obstacle signal. The calculation module 23 controls the vehicle 2 to avoid the obstacle or stop moving according to the obstacle signal, wherein the obstacle refers to other vehicles 2 or human beings. In an embodiment of the present invention, the obstacle avoiding module 25 refers to an ultrasonic wave detector U, which is applied in an amount of six. Each ultrasonic wave detector U is disposed on the front portion of the vehicle 2, wherein three of them are installed at the right side, and three of them are installed at the left side of the vehicle 2. The ultrasonic wave detectors U on the same side are arrange to face toward different directions at an angle of 10 degrees, 30 degrees, and 50 degrees with respect to the front direction of the vehicle 2, respectively, as shown by FIG. 6. Each ultrasonic wave detector U is able to detect a 20 degrees range on the front side thereof. In other words, during the movement of the user 4, obstacles in the 20 degree detection range are detected by the corresponding ultrasonic wave detector U. In other embodiments, the positions and the detection angles of the ultrasonic wave detectors U are allowed to be adjusted according to different demands, which are not limited by the embodiment here.

With the foregoing configuration, the present invention achieves following effects.

The obstacle avoiding guidance system 100 limits the movement range 111 of the vehicle 2, so that the vehicle 2 follows the user 4 in the movement range 111. Therefore, the vehicle 2 is effectively prevented from moving into inappropriate areas.

When establishing the movement range 111, the processing device 10 of the obstacle avoiding guidance system 100 defines the areas having obstacles therein as the special areas 114. Therefore, with the limitation of the movement range 111, the vehicle 2 is allowed to effectively avoid the obstacles.

When the vehicle 2 follows the user 4 to move, the obstacle avoiding guidance system 100 guides the movement direction of the vehicle 2 by use of the target points 113, so as to prevent the vehicle 2 from arbitrarily and continuously moving toward the user 4 in the movement block 112 and thereby causing additional power waste.

The processing device 10 forms the enclosed movement range 111 by use of the two-dimensional coordinate points A, effectively lowering the data processing time and the memory capacity requirements, thereby efficiently establishing the movement blocks and increasing the data processing efficiency.

The obstacle avoiding guidance system 100 sets up the movement range 111 via the processing device 10 and limits the movement range 111 of the vehicle 2 via the calculation module 23, and also detects the obstacles in the movement range 111 via the obstacle avoiding module 25, achieving an effective following and obstacle avoiding effects.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An obstacle avoiding guidance system, comprising:
a processing device applied for setting a movement range in a region, wherein the movement range has a plurality of target points therein, and wherein the movement range is divided into a plurality of movement blocks; each two neighboring movement blocks partially overlap; each of the movement blocks has one of the corresponding target points; and
a guidance device disposed on a vehicle and having a detection module, a positioning module, and a calculation module, the detecting module being applied for detecting a current position of a user, the positioning module being applied for detecting a current position of the vehicle and generating a position signal, the calculation module receiving the movement range and comparing the position signal and the movement range, such that the calculation module controls the vehicle to follow the user in the movement range and move toward the target points.

2. The obstacle avoiding guidance system of claim 1, wherein the processing device acquires longitude and latitude coordinates through a satellite image for establishing each movement block, and each movement block is an enclosed area formed of a plurality of two-dimensional coordinates.

3. The obstacle avoiding guidance system of claim 2, wherein the positioning module is applied for generating the position signal of the two-dimensional coordinates; the calculation module determines that the vehicle is in one of the movement blocks according to the position signal; the calculation module compares the position signal and the two-dimensional coordinates of the corresponding movement block.

4. The obstacle avoiding guidance system of claim 1, further comprising a target device carried by the user, the detection module sending a first signal, the target device receiving the first signal and sending a second signal to the calculation module, the target device being connected with the detection module via an ultra-wideband communication, the calculation module generating a movement signal according to the first signal and the second signal, the vehicle being controlled to follow the user in the movement range according to the movement signal.

5. The obstacle avoiding guidance system of claim 4, wherein the detection module has two sense units and an inertia unit, the sense units sending the first signal, respectively, the inertia unit detecting a directional angle signal of the vehicle, the calculation module generating the movement signal according to the first signal, the second signal, and the directional angle signal.

6. The obstacle avoiding guidance system of claim 5, wherein the processing device sets a plurality of special areas in the movement range, such that the calculation module determines if the vehicle moves toward any one of the special areas according to the directional angle signal or the position signal of the positioning module, so as to control the vehicle to avoid the special areas.

7. The obstacle avoiding guidance system of claim 1, wherein the guidance device has an obstacle avoiding module applied for detecting obstacles in the movement range and accordingly generating an obstacle signal, and the calculation module controls the vehicle to avoid the detected obstacles or stop moving according to the obstacle signal.

8. The obstacle avoiding guidance system of claim 1, wherein the guidance device has a reminder module; when the calculation module determines that the vehicle moves close to a border of the movement range, the reminder module sends a warning signal.

9. The obstacle avoiding guidance system of claim 6, wherein the guidance device has an obstacle avoiding module applied for detecting obstacles in the movement range and accordingly generating an obstacle signal, and the calculation module controls the vehicle to avoid the detected obstacles or stop moving according to the obstacle signal.

* * * * *